United States Patent [19]

Schmidt

[11] Patent Number: 5,644,617

[45] Date of Patent: Jul. 1, 1997

[54] METHOD AND APPARATUS FOR TESTING CABLES

[75] Inventor: Kurt E. Schmidt, Lindenhurst, Ill.

[73] Assignee: Teradyne, Inc., Boston, Mass.

[21] Appl. No.: 371,734

[22] Filed: Jan. 12, 1995

[51] Int. Cl.⁶ .......................... H04M 1/24; G01R 27/02; H04B 17/00
[52] U.S. Cl. .................. 379/5; 379/22; 379/24; 379/6; 370/249; 370/251; 370/244; 324/611
[58] Field of Search ................ 379/5, 6, 22, 24, 379/27, 29, 30, 32; 370/13, 14, 249, 242, 244, 250, 251, 252; 324/602, 609, 611

[56] References Cited

U.S. PATENT DOCUMENTS

| | | | |
|---|---|---|---|
| 4,087,658 | 5/1978 | Hoppough | 379/24 |
| 4,247,742 | 1/1981 | Thelen | 379/24 |
| 4,320,338 | 3/1982 | Morris et al. | 379/24 |
| 4,560,842 | 12/1985 | Homer | 179/81 R |
| 4,611,101 | 9/1986 | Walter et al. | 379/6 |
| 4,835,462 | 5/1989 | Konrad | 379/24 |
| 4,852,145 | 7/1989 | Bevers et al. | 379/27 |

Primary Examiner—Curtis Kuntz
Assistant Examiner—Pal Loomis
Attorney, Agent, or Firm—Edmund J. Walsh; Richard E. Gamache

[57] ABSTRACT

Apparatus and method for testing lines. The apparatus is particularly useful for testing lines in a switched network, such as might be used to electronically route telephone and computer data lines to various offices in an office building. The apparatus includes an AC test source and a DC measurement device located at a near end switch. A DC transform circuit is located at a far end switch. According to the test method, an AC test signal is injected onto a line under test at the near end. At the far end, the received signal is converted to DC, which is sent to the near end. Line attenuation, and hence fault conditions, are detected by comparing the DC signal to the transmitted AC signal. Techniques to increase the signal to noise ratio of the DC signal are also disclosed.

17 Claims, 3 Drawing Sheets

METHOD AND APPARATUS FOR TESTING CABLES

This invention relates generally to automatic test equipment and more specifically to testing wires and cables.

With the proliferation off modern computer and telecommunications devices, the number off lines used to route electronic signals between such devices has drastically increased. The problems with routing and maintaining those lines has also increased.

Various types of electronic switching systems have been proposed to help manage the routing and rerouting of lines. Such switching systems might be used, for example in an office building. Lines for telephones and computer systems might be routed through the system to the various offices in the building. When computer equipment or telephone connections are changed, the system is reprogrammed to make the appropriate connections.

For the system to operate reliably, it is important to be able to verify that the lines are carrying signals without distortion. Lines might be accidentally cut. Alternatively, they might suffer from any number of fault conditions which degrade the signals carried by the wires. For example, lines that get wet, twisted, crushed, kinked or have their insulation worn away might not carry signals well.

One technique for testing lines in a switching system called a loopback test. Two lines are used for the test. The lines are connected together at the far end, i.e. the end at which user equipment would be connected. An AC test signal is injected into one line at the near end and measured at the other line. BY Comparing the two signals, the amount off attenuation in the two lines can be determined.

Loopback testing has the advantage of being relatively simple. The circuitry for the test is located at the near end, allowing the same circuitry to be used to measure many lines. However, the test signal receives twice the amount of attenuation and noise as a normal signal because it travels from the near end to the far end and then back to the near end. More importantly, there is some crosstalk between the line used to drive the test signal and the line used to return the test signal. The crosstalk is picked up by the receiver and can not be easily distinguished from the test signal. As the ratio of crosstalk to returned signal increases, the accuracy of the test decreases. For long lines, lines carrying RF frequencies or in other applications where there will be a significant amount of attenuation, noise or crosstalk, loopback testing is not suitable.

An alternative testing technique involves placing some test circuitry at the far end of the line. This circuitry measures the magnitude of the test signal and converts it to digital form. The digital data is then sent back to the test control circuitry at the near end of the line. The digital signal is not degraded by the noise or attenuation on the line carrying the signal from the far end back to the near end. However, the circuitry to convert the test signal to digital form and then transmit it back to the near end is expensive and therefore undesirable in a switching system.

It would be desirable to have a test system which is as accurate as using a digital conversion but less expensive.

SUMMARY OF THE INVENTION

With the foregoing background in mind, it is an object of the invention to provide circuitry for accurately and inexpensively testing lines in a switching system.

The foregoing and other objects are achieved in a switching system with a simple test module connected at the far end. The test module is connected to a line to be tested. It receives an AC signal from the near end. It generates a DC signal having a value proportional to the magnitude of the AC signal. That DC level is placed on a line and measured at the near end.

In one embodiment, the DC level is computed using analog circuitry having a rectifying characteristic and a low pass characteristic for averaging. In the preferred embodiment, this circuitry produces a DC signal having a magnitude proportional to the root mean square voltage of the AC test signal.

In another embodiment, the far end test circuitry includes a level sensitive gain circuit which amplifies the DC signal by a set amount when it falls below some threshold. According to one inventive feature, the far end test circuitry also includes a polarity inversion circuit which inverts the polarity of the DC signal when it is amplified to alert the near end test control circuitry that the signal has been amplified.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
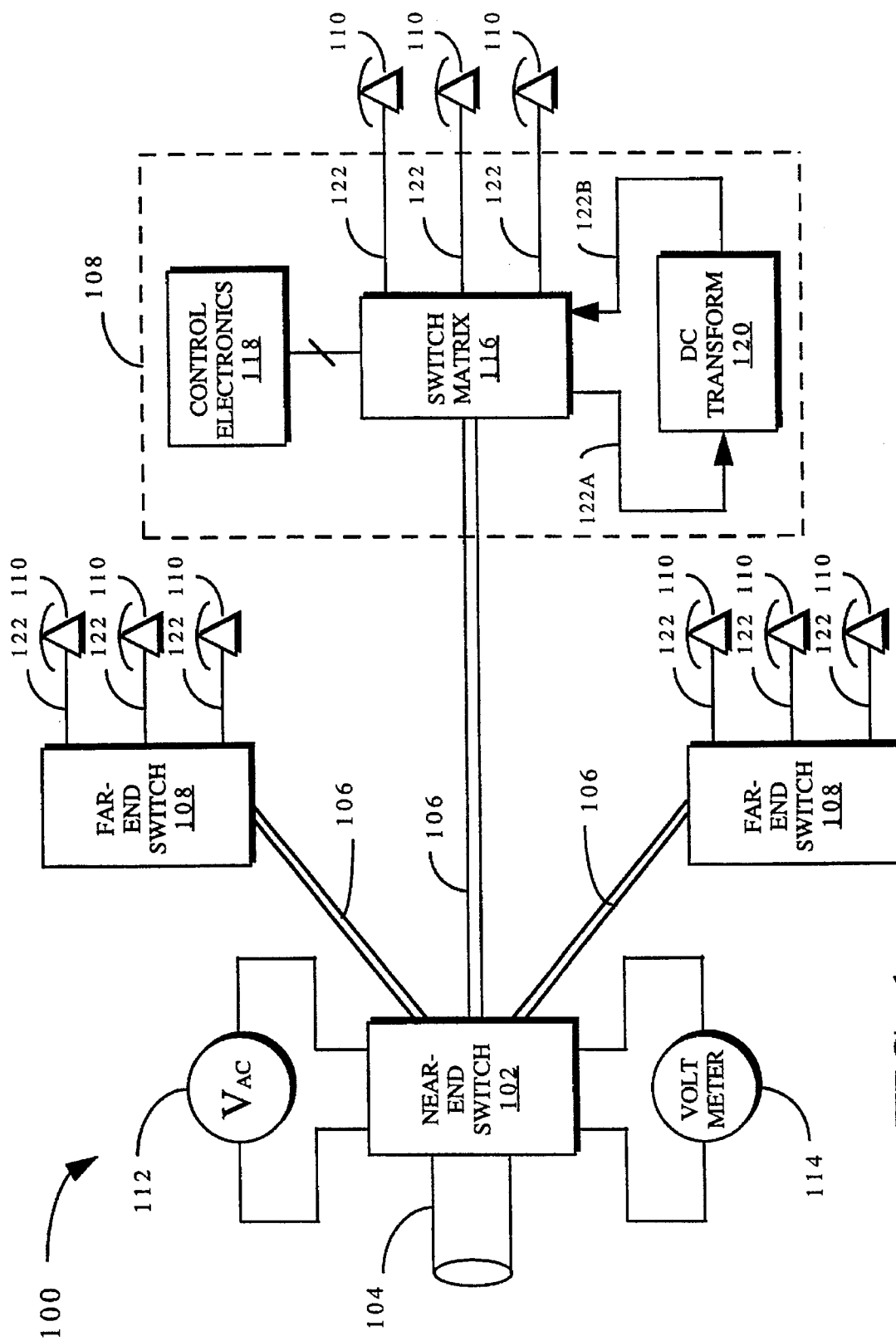
FIG. 1 is a sketch of a portion of a switching network incorporating the invention.

FIG. 1 shows a sketch of a portion of a switching network 100. The network includes near end switch 102. Near end switch 102 is an electronic switch of the type broadly classified as a cross bar switch. Such a switch is capable of switching any one of a number of input lines to any one of a number of output lines. The switching might be performed by physically connecting lines or electronically by significantly reducing the resistance of a circuit element connecting the lines.

In network 100, the input lines are shown to be provided through cable 104. Cable 104 might be connected to one or more other near end switches (not shown). Cable 104 is often called a "backbone," "vertical" or "riser" cable.

The output lines from near end switch 102 are routed through cables 106. Each cable 106 is routed to a far end switch 108. Far end switch 108 is also of the cross bar type. Any one of the lines within cable 106 may be switched to any one of the user lines 122.

In FIG. 1, user lines 122 are shown connected to user devices 110, which might be telephones or personal computers. User lines 122 are generally very short. Any one of the user devices 110 might be connected, through operation of near end switch 102 and far end switches 108, to any one of the lines in cable 104. Such an arrangement allows the network to be easily reconfigured. For example, each of the lines 122 might run to an office in an office building and cable 104 might run to the PBX telephone system for that building. Each user device 110 would be assigned its own extension. However, if the office location for a particular extension needed to be changed, near end switch 102 and far end switches 108 would be reconfigured to make the change.

Both near end switch 102 and far end switches 108 are controlled electronically. A controller, not shown, generates the commands to actuate switches 102 and 108. The controller may be a computer or other digital circuitry of the type traditionally used to control switching systems. The controller might be located in near end switch 102 or far end switches 108 or at any other convenient location.

To determine which connections should be made at each switch, the controller receives input about the required connections to be made. The input might, for example, be provided by a human entering a table indicating which of the lines in cable 104 should be connected to which of the lines 122.

In the embodiment shown in FIG. 1, the controller is located in near end switch 102. The controller not only controls the connections made in the network. It also controls testing of the lines in the network. The testing might be performed in response to user inputs. Alternatively, it might be performed at scheduled times or at random intervals. It is well known that a computer or similar controller can be programmed to execute tasks in such a fashion.

FIG. 1 shows the circuitry incorporated in network 100 to perform testing according to the invention. AC voltage source 112 is connected to near end switch 102. AC voltage source 112 is connected in the same fashion as the lines in cable 104. Thus, near end switch 102 can be actuated to apply an AC voltage to any one of the lines in any of the cables 106. The magnitude of the voltage is not critical to the invention, but the magnitude should preferably be either known or controlled by the controller (not shown). The frequency of the AC signal is also not critical to the invention, but it is preferably in the operating range of frequencies. AC voltage source 112 is shown to provide a differential output. A differential output is appropriate when each line is made up of a pair of wires, as in a telephone network, but a single ended source might be used as well.

Volt meter 114 is similarly connected to near end switch 102. It can be switched to any one of the lines in any one of the cables 106. Voltmeter 114 is a device which can measure at least a DC voltage and provide an indication of the value of the measured voltage to the controller (not shown). A conventionally available analog to digital converter might be used for this purpose. Preferably, voltmeter 114 has a very high input impedance to reduce measurement errors associated with input leakage current. Preferably, voltmeter 114 is connected through a low pass filter such that the measurements it makes are not influenced by noise.

To conduct a test of a line, AC voltage source 112 is switched to the line under test. Voltmeter 114 is connected to another line in the same cable 106 as the line under test, which acts as a return line.

Far end switch 108 is made up of some control electronics, which respond to signals sent through a cable 106 from the controller (not shown). Control electronics 118 controls a switch matrix 116. Switch matrix 116 is the crossbar switch. The outputs of switch matrix 116 make up the user lines 122.

During a test, the line under test is switched to output 122A of switch matrix 116. The return line is switched to output 122B. Output 122A is connected to the input of DC transform circuit 120. Output 122B is connected to the output of DC transform circuit 120.

DC transform circuit 120 receives an AC voltage at its input. It transforms the AC voltage to a DC value. The transform might be done by computing the root mean square (RMS) value of the AC signal. Alternatively, the peak value of the AC signal might be provided- As another alternative, the average of the rectified signal might be provided. Regardless of the type of transform used, the DC level out of DC transform circuit 120 indicates the magnitude of the AC signal received at far end switch 108.

At the near end, voltmeter 114 measures the transformed DC voltage. The DC value is provided to the controller. The controller can compare the magnitude of the signal transmitted by AC source 112 to the magnitude of the signal received at far end switch 108. This allows the controller to determine the attenuation on the line under test.

A high attenuation is often indicative of a fault on the line under test. In the worst case, if there is a break in the line, the DC value on the return line will be nearly zero, indicating an infinite attenuation. The controller compares the attenuation to a threshold value. If the attenuation is greater than the threshold, a fault is indicated.

The threshold value might be determined in any number of ways. One possibility is to measure the attenuation on the line when it is installed and known to be functioning properly. The measured attenuation, or some small amount higher, might be stored as a threshold. Alternatively, the expected attenuation on a line might be computed from the line impedance and its length and used as a threshold. Another approach is to set the threshold at some level which represents the maximum attenuation which can be tolerated in the network and still have the network transmit signals with an acceptable error rate or noise level. Thus, the exact value of the threshold to be used will vary depending on the type of network, the length of the lines, the type of the lines, the amount of noise present and other factors.

When the controller measures an attenuation exceeding the threshold, it outputs the information to a human repair person through any output device customarily attached to a computer. For example, a video display terminal, a printer or a disk drive might be used as output devices. The repair person can then use the information to repair the faulty cable. Alternatively, the controller can use the information to reroute signals through the faulty line. Another line in the same cable 106 could be used to carry the information simply by changing the settings of near end switch 102 and far end switch 108. The use of the failure information will depend on the programming of the controller and the type of the network.

One advantage of using a DC transform is that the DC signal on the return line is not attenuated like an AC signal. Thus, the measured attenuation reflects the attenuation on only the line under test. The measured signal has a higher signal to noise ratio and provides more accurate test results. It can be used in situations where there is too much attenuation for a conventional loopback technique to be used.

Another advantage of using a DC transform is its low cost. As will be shown below in conjunction with FIG. 2, the circuitry needed to implement a DC transform is relatively simple. It can be implemented with lower cost than circuitry which might be required to convert the AC test signal to a digital value.

Figure 2A:
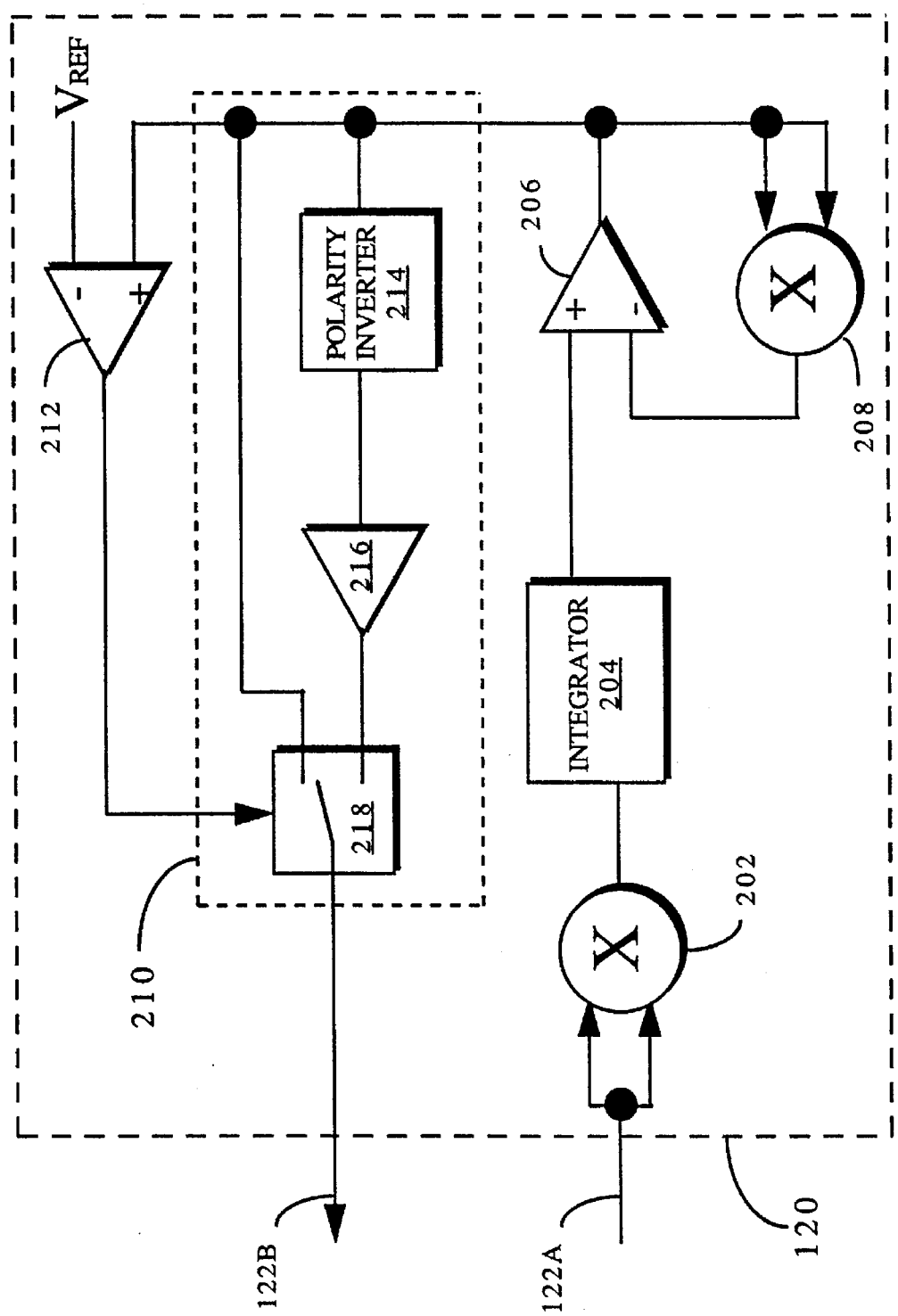
FIG. 2A is a schematic of a preferred embodiment of the DC transform circuit of FIG. 1.

Turning now to FIG. 2A, a schematic of DC transform circuitry 120 is shown. In the embodiment of FIG. 2A, a root mean square transform is used to produce a DC signal.

The test signal on line 122A is passed to multiplier 202. The test signal is applied to both inputs of multiplier 202, thereby implementing a squaring function. Multiplier 202 might be a four quadrant analog multiplier, such as those sold in the trade with the designation AD835. Such a multiplier has differential inputs and is suitable for use when testing two wire lines.

The output of multiplier 202 is provided to integrator 204. Integrator 204 has the effect of averaging the output of multiplier 202. It, thus, computes the average, or mean, of the squared value. Integrator 204 may be simply implemented by a series resistor with a capacitor bridge to ground. A 1 kΩ resistor and a 0.1 µF capacitor are suitable in high frequency applications, though the values of the resistor and capacitor will preferably be selected based on the frequency range of the test signal.

The output of integrator 204 is provided to the noninverting input of operational amplifier 206. Operational amplifier 206 is configured with multiplier 208 in its feedback path. Multiplier 208, like multiplier 202, is configured to provide a squaring function. The combination of operational amplifier 206 and multiplier 208 outputs the square root of the input. This output is the root mean square of the received AC test signal and may thus be represented as a DC signal.

The output of amplifier 206 could be provided to line 122B as the DC signal. However, in FIG. 2A additional circuitry is included to improve the performance of low level measurements in the presence of noise. In that circuit the output of amplifier 206 is provided to comparator 212. Comparator 212 has as its second input a voltage $V_{REF}$ which defines the upper bound of what is meant by a low level signal. Here, 300 mV is used. However, the exact value will depend on noise on the network, amplitude of source 112, the dynamic range of meter 114 and other factors which might need to be empirically determined.

When comparator 212 indicates that the signal is above $V_{REF}$, switch 218 is actuated such that the output of amplifier 206 is passed directly to line 122B. When comparator 212 indicates that the signal is below $V_{REF}$, switch 218 is actuated such that the output of amplifier 206 is passed through the path containing amplifier 216 before it is passed to line 122B.

Amplifier 216 provides gain to boost the strength of the low level signals. Here, a gain of 10 is used, but the appropriate value will vary depending on noise on the network, amplitude of source 112, the dynamic range of meter 114 and other factors which might need to be empirically determined.

Because the magnitude of the DC signal on line 122B is used by the controller (not shown) to compute attenuation, the fact that gain has been introduced into the DC signal must be made known to the controller in some fashion. Here, the signal path which includes amplifier 216 includes polarity inverter 214. Polarity inverter 214 converts a positive DC signal to a negative DC signal of the same magnitude. Because the RMS value of an AC signal is always positive, any negative signal must have passed through the path where the gain of amplifier 216 was added. Any negative signal must therefore be scaled back by the gain of amplifier 216 before being used to compute attenuation.

FIG. 2A shows a the construction of variable gain circuit 210 in a schematic fashion. Components which might be used to provide the function of variable gain circuit 210 for a two wire line are shown in FIG. 2B.

Figure 2B:
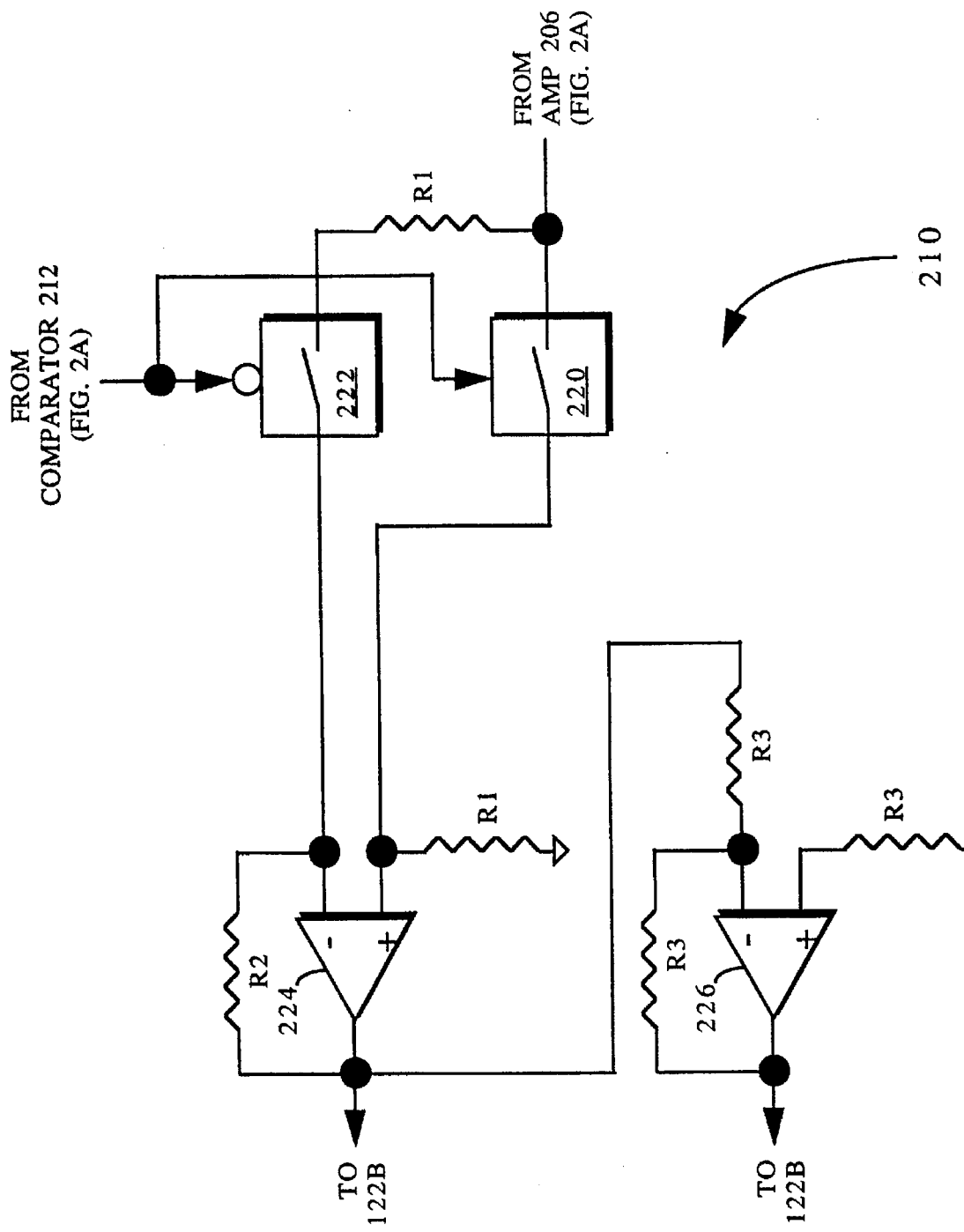
FIG. 2B is a schematic of a preferred implementation of the variable gain circuit of FIG. 2A.

In FIG. 2B, the signal from amplifier 206 is provided to switch 220. The same signal is passed to switch 222 through resistor $R_1$. Switches 220 and 222 have their control inputs connected to the output of comparator 212. Switch 220 is a normally open switch and switch 222 is a normally closed switch. Thus, only one of the switches will be closed at a time.

When the output of amplifier 206 exceeds $V_{REF}$, switch 220 will be closed. The output of amplifier 206 will be applied to the noninverting input of amplifier 224. With switch 222 open, amplifier 224 will be configured as a unity gain amplifier and the signal will be passed directly to line 122B.

When the output of amplifier 206 is below $V_{REF}$, switch 222 is closed. The output of amplifier 206 is passed to the inverting input of amplifier 224. With switch 220 open, amplifier 224 is configured as an inverting amplifier. The gain of the amplifier is controlled by the ratio of resistors $R_1$ to $R_2$, which is here chosen to be 1:10, i.e. a gain of −10. The inverted and amplified signal is passed to line 122B.

The output of amplifier 224 is passed through resistor $R_3$ to the inverting input of amplifier 226. Amplifier 226 is configured as a unity gain inverting amplifier. Amplifier 226 provides a bridged or differential drive output which can be used when the lines to be tested are made up of a pair of wires.

Having described one embodiment, numerous alternative embodiments or variations might be made. For example, the test circuitry of the invention was described as being permanently located in each far end switch. The same functionality can be achieved if the transform circuitry were included in the near end switch and the measurement circuitry were included in the far end switch. Alternatively, the transform circuitry of the invention might be incorporated into a hand held or portable unit which is plugged into one of the switches for a test. Likewise, the source and measurement circuitry does not have to be connected to the line under test through the switch and does not have to be permanently connected to the network. Source and measurement circuitry could also be in a hand held unit or could be directly connected to the lines to be tested.

Also, the preferred embodiment was illustrated in a network of twisted pair of wires. The invention might be employed with any type of line, such as cables, wires, coax or twisted pair. In addition, FIG. 1 shows that the far end switch is used to select one of a plurality of lines in a cable to one of a plurality of user devices. The invention might also be used with a far end switch attached to each wire which operated simply to assign wires in the line to selected pins of a port to which a user device is connected. More generally, the invention can be employed in any network which can connect the transform circuit to a line. In this regards, it should be noted that the preferred embodiment showed that the DC signal is provided back to the measurement circuitry over a separate line than the one being tested. Because the test signal is AC and the measured valued is reported as a DC signal, both signals could be carried simultaneously on the same line using a simple frequency division multiplexing scheme.

It was described that a line test was conducted at a single frequency and voltage level. AC signal source 112 might accept control inputs which change the magnitude or frequency of the test signal. Attenuation measurements might then be made over frequency. In such a case, the absolute level of attenuation might be compared to a threshold at all frequencies. In addition, the change in attenuation over the range of frequencies might also be compared to a reference as the change in attenuation indicates the amount of signal distortion present. Changing the voltage level of the input test signal might help detect nonlinear faults on the line.

Also, the test apparatus was described as being useful only for measuring the attenuation of the line. If no test signal is injected on the line, the DC response signal might be used to indicate the amount of noise on the line. In this case, a measured signal above a noise threshold might indicate an error. Making measurements without a signal source applied is also useful in removing or calibrating out noise contributions from measurements made with the test circuitry.

In addition, it was described that the computed attenuation was used as the sole indication of a faulty line. The attenuated value might be used in conjunction with other measurements, such as near end cross talk, to diagnose faulty lines.

Therefore, the invention should be limited only by the spirit and scope of the appended claims.

What is claimed is:

1. In a network comprising a plurality of high speed digital lines connecting a first switch and a second switch, with each switch having a plurality of ports, each of which can be switched to one of the high speed digital lines, an improved test apparatus comprising:

a) a signal source connected to a port of the first switch;

b) a DC voltage meter connected to a different port of the first switch; and c) electronic circuitry having an input and an output, wherein an AC signal at the input is converted to a DC signal at the output, and the input is connected to a port of the second switch and the output is connected to a different port of the second switch, wherein the second switch is a far end switch, and wherein the plurality of ports of the second switch are connectable to a plurality of user devices, each user device being selected from the group consisting of a telecommunications device and a personal computer.

2. The improved test apparatus of claim 1 wherein the electronic circuitry comprises means for producing a DC signal at the output having a magnitude deterministically related to the root mean square value of the AC signal at the input.

3. The improved test apparatus of claim 2 wherein the means for producing a DC signal comprises means for producing a DC signal related to the root mean square value of the AC signal by a proportionality factor at the input when the AC signal has a value above a predetermined threshold and a DC signal related to the root mean square value of the AC signal by the proportionality factor multiplied by a predetermined gain when the AC signal has a value below the predetermined threshold.

4. The improved test apparatus of claim 3 wherein the predetermined gain is negative.

5. The improved test apparatus of claim 1 wherein the electronic circuitry is hard-wired to the second switch.

6. The improved test apparatus of claim 1 wherein the electronic circuitry comprises:

a) a first resistor connected at a first end to an input node;

b) an amplifier with an inverting input and a noninverting input and an output;

c) a first switch connecting the input node to the noninverting input of the amplifier;

d) a second switch, controlled to be in the opposite state as the first switch, connecting a second end of the first resistor to the inverting input through a resistor; and d) a feedback resistor between the output of the amplifier and the inverting input.

7. In a network comprising a plurality of lines connecting a first switch and a second switch, with each switch having a plurality of ports, each of which can be switched to one of the lines, an improved test apparatus comprising:

a) a signal source connected to a port of the first switch;

b) a DC voltage meter connected to a different port of the first switch;

c) electronic circuitry having an input and an output, wherein an AC signal at the input is converted to a DC signal at the output, and the input is connected to a port of the second switch and the output is connected to a different port of the second switch; and d) a computer programmed to actuate the first switch to connect the signal source to a first one of the plurality of lines and the DC voltage meter to a second one of the plurality of lines and to actuate the second switch to connect the input of the electronic circuitry to the first of the plurality of lines and the output of the electronic circuitry to the second of the plurality of lines.

8. In a network comprising a plurality of lines connecting a first switch and a second switch, with each switch having a plurality of ports, each of which can be switched to one of the lines, an improved test apparatus comprising:

a) a signal source connected to a port of the first switch;

b) a DC voltage meter connected to a different port of the first switch; and c) electronic circuitry having an input connected to a port of the second switch, an output connected to a different port of the second switch, and a means for producing a DC signal, wherein an AC signal at the input is converted to a DC signal at the output, and wherein the DC signal has a value of a first polarity when the AC signal is above a predetermined threshold and the DC signal has a value with a polarity opposite the first polarity when the AC signal is below a predetermined threshold.

9. The improved test apparatus of claim 8 wherein the electronic circuitry also comprises means for amplifying the DC signal of the opposite polarity.

10. A switched electrical network comprising:

a) first switch means for connecting one of a plurality of inputs to one of a plurality of high speed digital lines;

b) means, connected to the first switch means, for injecting an AC test signal onto one of the plurality of high speed digital lines;

c) means, connected to the first switch means, for measuring a DC level on one of the plurality of high speed digital lines;

d) second switch means for connecting one of the plurality of high speed digital lines to one of a plurality of device ports;

e) DC transform means, having an input connected to one of the plurality of device ports and an output connected to another one of the plurality device ports of the second switch means, for converting an AC signal to a DC value deterministically related to the magnitude of the AC signal, wherein the second switch means is a far end switch, and wherein the plurality of device ports of the second switch means are connectable to a plurality of user devices, each user device being selected from the group consisting of a telecommunications device and a personal computer.

11. The switched electrical network of claim 10 additionally comprising means for controlling the network connected to the first switch means and the second switch means.

12. The switched electrical network of claim 11 wherein the control means comprises means for computing the attenuation of a line under test.

13. The switched electrical network of claim 12 wherein the control means comprises means for rerouting connections between the first switch means and the second switch means when the computed attenuation of a line is above a predetermined threshold.

14. A switched electrical network comprising:
 a) first switch means for connecting one of a plurality of inputs to one of a plurality of lines;
 b) means, connected to the first switch means, for injecting an AC test signal onto one of the plurality of lines;
 c) means, connected to the first switch means, for measuring a DC level on one of the plurality of lines;
 d) second switch means for connecting one of the plurality of lines to one of a plurality of device ports;
 e) DC transform means, having an input connected to one of the plurality of device ports and an output connected to one of the device ports of the second switch, for converting an AC signal to a DC value deterministically related to the magnitude of the AC signal; and
 f) means for controlling the network connected to the first switch means and the second switch means, comprising
   means for computing the attenuation of a line under test, and
   means for indicating a fault condition when the computed attenuation is above a predetermined threshold.

15. A method of testing one of a plurality of high speed digital lines, comprising the steps of:
 a) injecting an AC test signal into a line under test, the line under test being one of the plurality of high speed digital lines;
 b) receiving the AC test signal at a point where it has propagated down the line under test;
 c) producing a DC signal having a magnitude deterministically related to the magnitude of the received AC test signal;
 d) placing the DC signal onto a return line, the return line being another one of the plurality of high speed digital lines;
 e) receiving the DC signal at a point where it has propagated down the return line; and
 f) comparing the DC signal to the magnitude of the injected AC signal and determining whether a fault condition exists.

16. A method of testing one of a plurality of lines, comprising the steps of:
 a) injecting an AC test signal into a line under test, the line under test being one of the plurality of lines;
 b) receiving the AC test signal at a point where it has propagated down the line under test;
 c) producing a DC signal having a magnitude deterministically related to the magnitude of the received AC test signal, wherein the producing comprises the sub-steps of
   i) producing an intermediate DC signal having a magnitude proportional to the received AC signal,
   ii) comparing the intermediate DC signal to a threshold, and
   iii) when the intermediate DC signal is below the threshold, inverting and amplifying the intermediate DC signal;
 d) placing the DC signal onto another one of the plurality of lines;
 receiving the DC signal at a point Where it has propagated down the line; and
 f) comparing the DC signal to the magnitude of the injected AC signal and determining whether a fault condition exists.

17. The method of claim 16 wherein the step of producing an intermediate DC signal comprises producing a DC signal proportional to the RMS value of the received AC signal.

\* \* \* \* \*